(12) United States Patent
Yuasa (10) Patent No.: US 9,966,796 B2
(45) Date of Patent: May 8, 2018

(54) POWER RECEPTION DEVICE AND POWER TRANSMISSION DEVICE

(71) Applicant: TOYOTA JIDOSHA KABUSHIKI KAISHA, Toyota-shi, Aichi-ken (JP)

(72) Inventor: Hiroaki Yuasa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 148 days.

(21) Appl. No.: 15/198,470

(22) Filed: Jun. 30, 2016

(65) Prior Publication Data

US 2017/0040840 A1 Feb. 9, 2017

(30) Foreign Application Priority Data

Aug. 7, 2015 (JP) ................... 2015-157210

(51) Int. Cl.
| | |
|---|---|
| *H01F 27/42* | (2006.01) |
| *H02J 50/10* | (2016.01) |
| *B60L 11/18* | (2006.01) |
| *H01F 27/28* | (2006.01) |
| *H01F 38/14* | (2006.01) |
| *H02J 7/02* | (2016.01) |

(52) U.S. Cl.
CPC .............. *H02J 50/10* (2016.02); *B60L 11/182* (2013.01); *H01F 27/28* (2013.01); *H01F 38/14* (2013.01); *H02J 7/025* (2013.01)

(58) Field of Classification Search
CPC ......... H02J 50/10; H02J 7/025; B60L 11/182; H01F 27/28; H01F 38/14
See application file for complete search history.

(56) References Cited

U.S. PATENT DOCUMENTS

| | | |
|---|---|---|
| 7,741,734 B2 | 6/2010 | Joannopoulos et al. |
| 2007/0222542 A1 | 9/2007 | Joannopoulos et al. |
| 2008/0129246 A1 | 6/2008 | Morita et al. |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |

(Continued)

FOREIGN PATENT DOCUMENTS

| | | |
|---|---|---|
| AU | 2006269374 B2 | 1/2007 |
| AU | 2007349874 A2 | 10/2008 |

(Continued)

*Primary Examiner* — Jared Fureman
*Assistant Examiner* — Duc M Pham
(74) *Attorney, Agent, or Firm* — Oliff PLC (57) ABSTRACT

In a power reception device, a ferrite includes an annular coil mount on which a power reception coil is disposed at the facing surface side, and a projection projecting in a power reception direction from a portion of the coil mount located on an inner side of the power reception coil, a back surface of the ferrite is provided with a hollow portion formed of the projection and the coil mount, the power reception coil is provided at the outer peripheral surface side of the projection, and a filter coil is provided along an inner peripheral surface of the hollow portion.

4 Claims, 7 Drawing Sheets

(56) References Cited

U.S. PATENT DOCUMENTS

| | | |
|---|---|---|
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2013/0127409 A1 | 5/2013 | Ichikawa |
| 2013/0193749 A1* | 8/2013 | Nakamura ............... B60L 3/00 307/9.1 |
| 2015/0008877 A1* | 1/2015 | Ichikawa ............. H01F 27/362 320/108 |
| 2015/0364924 A1* | 12/2015 | Yuasa .................... H01F 27/02 307/104 |
| 2015/0371771 A1* | 12/2015 | Abu Qahouq ....... H04B 5/0087 307/104 |
| 2017/0237295 A1* | 8/2017 | Yuasa .................... H01F 38/14 307/104 |

FOREIGN PATENT DOCUMENTS

| | | |
|---|---|---|
| AU | 2010200044 A1 | 1/2010 |
| AU | 2006269374 C1 | 3/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | 2008-120239 A | 5/2008 |
| JP | 2009-501510 A | 1/2009 |
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |

* cited by examiner

POWER RECEPTION DEVICE AND POWER TRANSMISSION DEVICE

This nonprovisional application is based on Japanese Patent Application No. 2015-157210 filed on Aug. 7, 2015, with the Japan Patent Office, the entire contents of which are hereby incorporated by reference.

BACKGROUND OF THE INVENTION

Field of the Invention

The present invention relates to a power reception device and a power transmission device each including a coil, a ferrite, and a filter coil.

Description of the Background Art

A variety of wireless charging systems in which electric power is transmitted from a power transmission device to a power reception device in a wireless manner have been conventionally proposed (Japanese Patent Laying-Open No. 2013-154815, Japanese Patent Laying-Open No. 2013-146154, Japanese Patent Laying-Open No. 2013-146148, Japanese Patent Laying-Open No. 2013-110822, and Japanese Patent Laying-Open No. 2013-126327).

Japanese Patent Laying-Open No. 2008-120239 describes a coil unit including a coil and an E-shaped core. The E-shaped core is formed in a rectangular shape when seen in plan view from above, and includes projecting portions formed on both side portions, and a central projecting portion formed in a central portion.

This E-shaped core is formed by stacking a plurality of block cores, where the block cores are disposed in contact with one another. The coil is mounted on the central projecting portion of the E-shaped core.

SUMMARY OF THE INVENTION

A power transmission device includes the coil unit as described above, which is often connected to a frequency converter and the like. A power reception device includes the coil unit as described above, and a rectifier for converting alternating-current (AC) power received by the coil unit into direct-current (DC) power and supplying the DC power to a DC load such as a battery.

The frequency converter of the power transmission device and the rectifier of the power reception device include a plurality of switching elements, and noise may be generated due to switching. In order to suppress the emission of the noise to the outside through the coil of the coil unit, a filter is disposed between the coil and the frequency converter, and between the coil and the rectifier. The filter generally includes an inductor core, and a filter coil wound around this filter core.

Containing such a filter in each of the power reception device and the power transmission device is problematic because it results in an increase in physical size of each of the power reception device and the power transmission device.

The present invention has been made in view of the problem as described above, and an object of the invention is to provide a power reception device and a power transmission device capable of achieving suppressed increase in size while incorporating a filter.

A power reception device according to the present invention is, in one aspect, a power reception device for receiving electric power from an externally provided power transmission device in a wireless manner while being disposed to face the power transmission device. The power reception device includes a power reception coil formed to surround a first winding axis extending in a power reception direction from the power reception device facing the power transmission device toward the power transmission device, the power reception coil being provided with an opening, a filter coil provided on an inner side of the power reception coil and formed to surround a second winding axis extending in the power reception direction, and a ferrite on which the power reception coil and the filter coil are disposed. The ferrite includes a facing surface facing the power transmission device, and a back surface located opposite the facing surface. The ferrite includes an annular coil mount on which the power reception coil is disposed at the facing surface side, and a projection projecting in the power reception direction from a portion of the coil mount located on an inner side of the power reception coil. The back surface of the ferrite is provided with a hollow portion formed of the projection and the coil mount. The power reception coil is provided at the outer peripheral surface side of the projection, and the filter coil is provided along an inner peripheral surface of the hollow portion.

According to the power reception device described above, the ferrite can be incorporated into a magnetic circuit of the filter coil, and even if the filter coil is incorporated into the power reception device, a size increase of the power reception device can be suppressed. In addition, since the filter coil is contained in the hollow portion formed in the back surface of the ferrite and the power reception coil is disposed on the ferrite at the facing surface side, magnetic coupling between the filter coil and the power reception coil is suppressed. Furthermore, since the filter coil is disposed to extend along the inner circumferential surface of the hollow portion, various devices can be disposed in the hollow portion of the filter coil.

Preferably, the power reception device further includes an inductor core provided in the hollow portion and extending along the inner peripheral surface of the hollow portion. The inductor core is magnetically connected to the coil mount and the projection, and the filter coil is provided on an outer peripheral surface of the inductor core.

According to the power reception device described above, the resistance of a magnetic path through which a magnetic flux generated by the filter coil passes can be reduced, thereby reducing the number of turns of the filter coil.

A power transmission device according to the present invention is, in one aspect, a power transmission device for transmitting electric power to an externally provided power reception device in a wireless manner while being disposed to face the power reception device. The power transmission device includes a hollow power transmission coil formed to surround a first winding axis extending in a power transmission direction from the power transmission device facing the power reception device toward the power reception device, a filter coil provided on an inner side of the power transmission coil and formed to surround a second winding axis extending in the power transmission direction, and a ferrite on which the power transmission coil and the filter coil are disposed. The ferrite includes a facing surface facing the power reception device, and a back surface located opposite the facing surface.

The ferrite includes an annular coil mount on which the power transmission coil is disposed at the facing surface side, and a projection projecting in the power transmission direction from a portion of the coil mount located on an inner side of the power transmission coil. The back surface of the ferrite is provided with a hollow portion formed of the projection and the coil mount. The power transmission coil is provided at the outer peripheral surface side of the projection, and the filter coil is provided along an inner peripheral surface of the hollow portion.

According to the power transmission device described above, even if the filter coil is incorporated into the power transmission device, a size increase of the power transmission device can be suppressed. In addition, magnetic coupling between the filter coil and the power transmission coil can be suppressed, and a core provided on the filter coil can be omitted or can be made compact.

Preferably, the power transmission device further includes an inductor core provided in the hollow portion and extending along the inner peripheral surface of the hollow portion. The inductor core is magnetically connected to the coil mount and the projection. The filter coil is provided on an outer peripheral surface of the inductor core.

According to the power transmission device described above, the resistance of a magnetic path through which a magnetic flux generated by the filter coil passes can be reduced, thereby reducing the number of turns of the filter coil.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
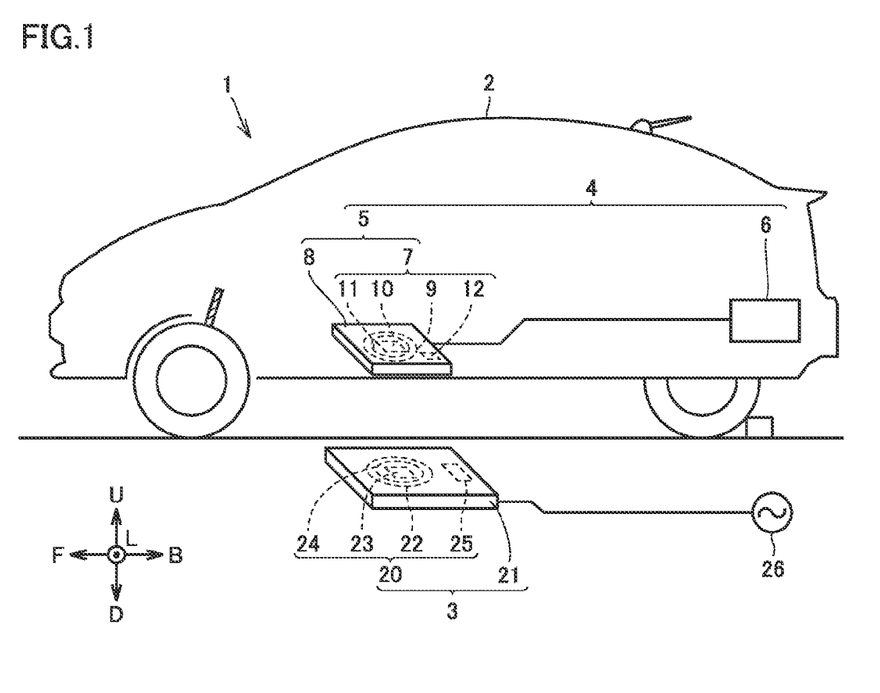
FIG. 1 is a schematic diagram schematically showing a wireless charging system 1
Figure 2:
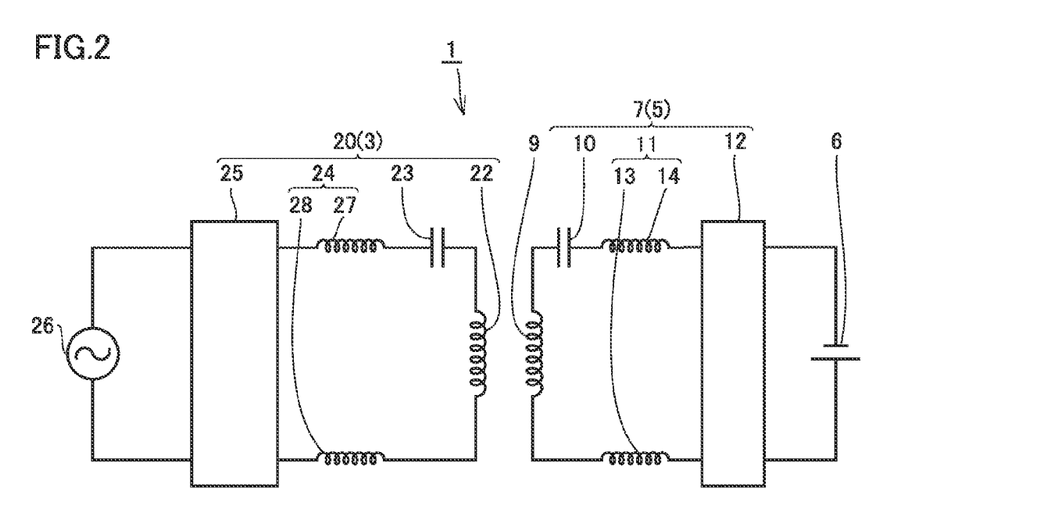
FIG. 2 is a circuit diagram schematically showing wireless charging system 1.

FIG. 1 is a schematic diagram schematically showing a wireless charging system 1, and FIG. 2 is a circuit diagram schematically showing wireless charging system 1. As shown in FIGS. 1 and 2, wireless charging system 1 includes a vehicle 2 having a power reception unit 4 mounted thereon, and a power transmission device 3.

Power reception unit 4 includes a power reception device 5 for receiving electric power from power transmission device 3 in a wireless manner, and a battery 6 for storing the power received by power reception device 5.

Power reception device 5 includes a coil unit 7, and a housing 8 for containing coil unit 7. Coil unit 7 includes a power reception coil 9, a capacitor 10 connected in series with power reception coil 9, a filter 11, and a rectifier 12.

Rectifier 12 converts AC power received by power reception coil 9 into DC power, and supplies the DC power to battery 6. Rectifier 12 can adopt various configurations, and may be configured to include a plurality of not-shown switching elements.

Filter 11 includes a filter coil 13 connected between power reception coil 9 and rectifier 12, and a filter coil 14 connected between capacitor 10 and rectifier 12. Filter 11 suppress the reflection of noise included in the power received by power reception coil 9 from rectifier 12 and the resultant emission of the noise to the outside through power reception coil 9. If rectifier 12 includes a switching element, the emission of noise generated by driving rectifier 12 to the outside through power reception coil 9 is suppressed.

Power transmission device 3 includes a coil unit 20, and a housing 21 for containing coil unit 20.

Coil unit 20 includes a power transmission coil 22, a capacitor 23 connected to power transmission coil 22, a filter 24, and a frequency converter 25 which is connected to a power supply 26.

Frequency converter 25 includes a plurality of not-shown switching elements. Frequency converter 25 changes the frequency of an AC current supplied from power supply 26, and boosts the voltage and supplies the voltage to power transmission coil 22.

Filter 24 prevents noise generated in frequency converter 25 from reaching power transmission coil 22. Filter 24 includes a filter coil 27 provided between capacitor 23 and frequency converter 25, and a filter coil 28 provided between frequency converter 25 and power transmission coil 22.

While the example shown in FIG. 2 illustrates a configuration including the filter coils as a filter, a capacitor may be disposed in parallel with power transmission coil 22 between the pair of filter coils and frequency converter 25.

Here, when power transmission device 3 transmits electric power to power reception unit 4 in a wireless manner and power reception device 5 receives the electric power from power transmission device 3 in a wireless manner, power transmission device 3 and power reception device 5 are aligned to face each other, as shown in FIG. 1.

In this example shown in FIG. 1, power reception device 5 is disposed on a bottom surface of vehicle 2 while power transmission device 3 is disposed in the ground, so that power reception device 5 and power transmission device 3 face each other in a vertical direction.

Thus, in this embodiment, a direction from power reception device 5 facing power transmission device 3 toward power transmission device 3 (power reception direction) is a downward direction D. A direction from power transmission device 3 facing power reception device 5 toward power reception device 5 (power transmission direction) is an upward direction U.

It is noted that each of the above-described directions varies with the positions where power reception device 5 and power transmission device 3 are mounted.

Figure 3:
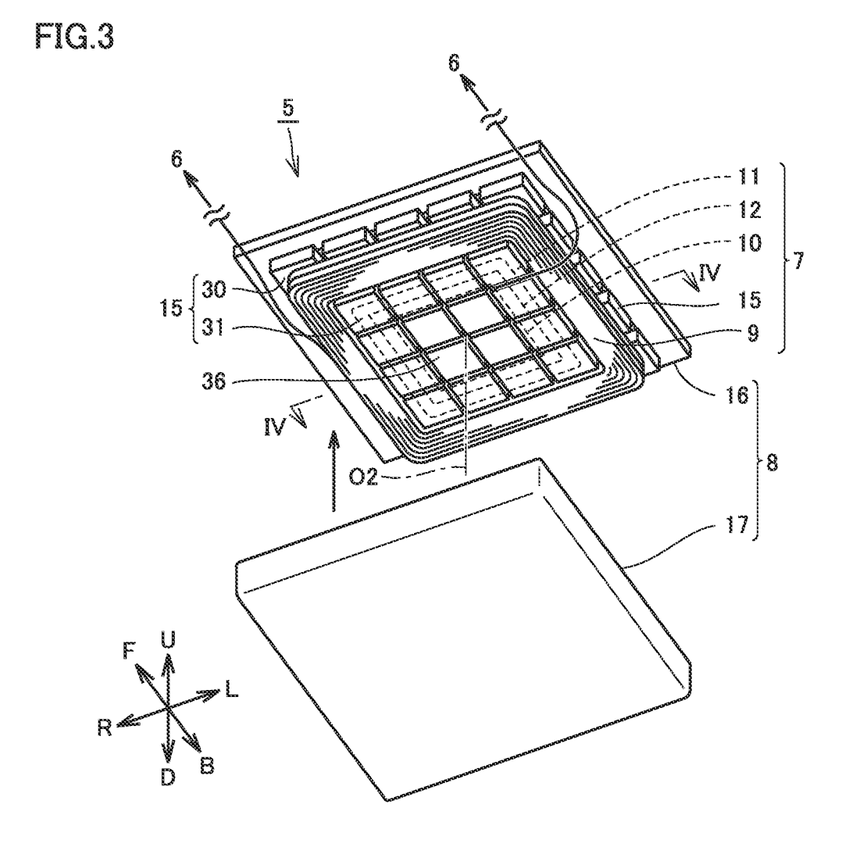
FIG. 3 is an exploded perspective view showing a power reception device 5.

FIG. 3 is an exploded perspective view showing power reception device 5. As shown in FIG. 3, power reception device 5 includes coil unit 7 and housing 8, where housing 8 includes a base plate 16 made of metal, and a resin cover 17 provided to cover base plate 16.

Coil unit 7 includes a ferrite 15, with power reception coil 9 disposed on a lower surface of ferrite 15. Power reception coil 9 is formed in an annular shape to surround a winding axis O2 (first winding axis) extending in downward direction D, and is provided with an opening in the center of power reception coil 9.

Figure 4:
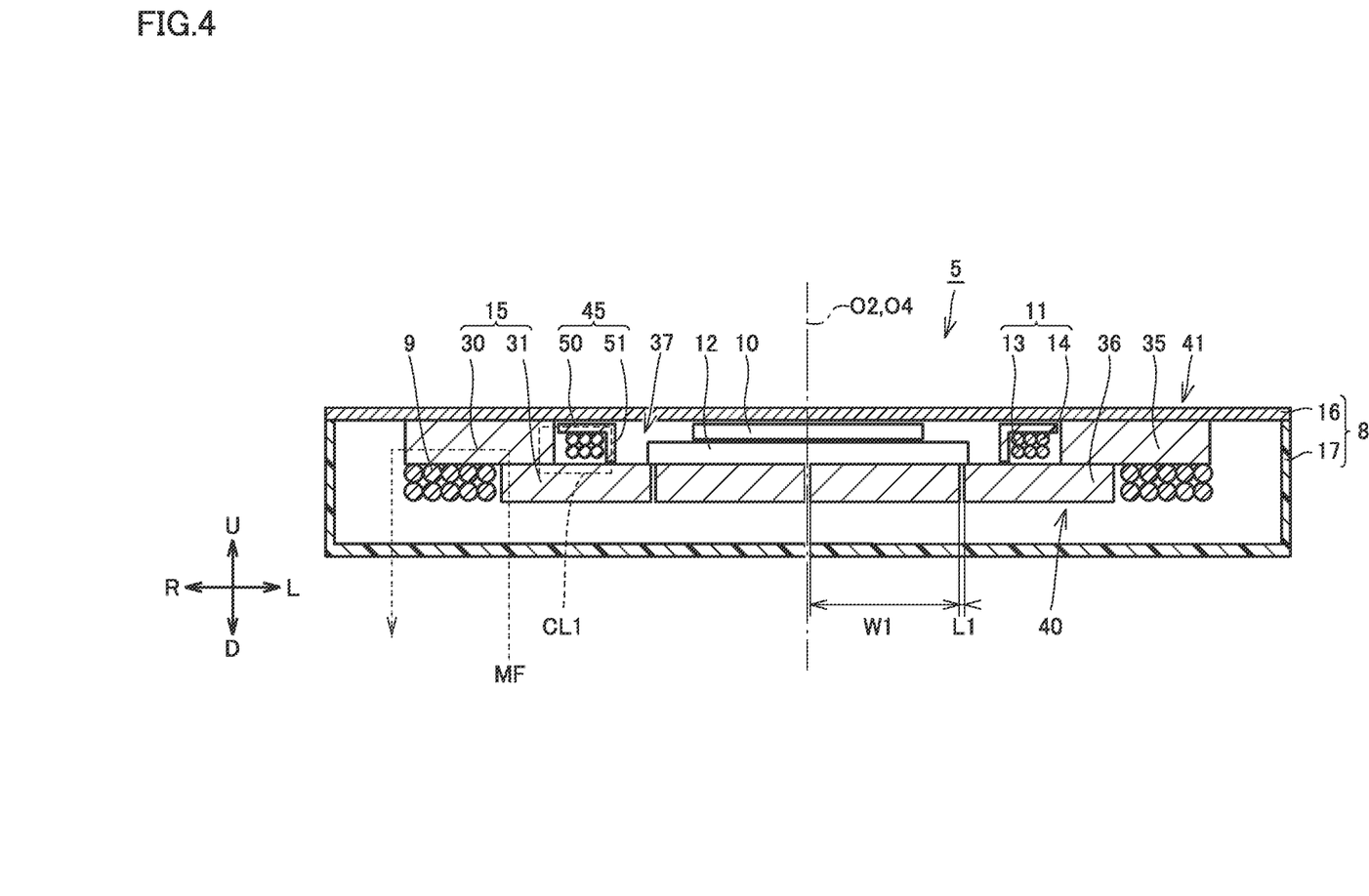
FIG. 4 is a cross-sectional view along line IV-IV in FIG. 3, showing power reception device 5.

FIG. 4 is a cross-sectional view along line IV-IV in FIG. 3, showing power reception device 5. In FIG. 4, when power reception device 5 receives electric power, power transmission device 3 is disposed in downward direction D relative to power reception device 5. Accordingly, the lower surface of ferrite 15 serves as a facing surface 40 facing power transmission device 3, while an upper surface of ferrite 15 serves as a back surface 41. Ferrite 15 includes an annular coil mount 30 on which power reception coil 9 is disposed at the facing surface 40 side, and a central ferrite 31 provided on a portion of coil mount 30 located on an inner side of power reception coil 9.

Coil mount 30 is formed by disposing a plurality of divided ferrites 35 in an annular shape at a distance from one another. Central ferrite 31 is formed by disposing a plurality of divided ferrites 36 in an array at a distance from one another, and is provided to close the opening in coil mount 30.

Central ferrite 31 (projection) is disposed on a portion of coil mount 30 on the inner side of power reception coil 9, and is provided to project in downward direction D from coil mount 30.

Thus, back surface 41 of ferrite 15 is provided with a hollow portion 37 formed of central ferrite 31 and coil mount 30.

Power reception device 5 includes a filter core (inductor core) 45 disposed in hollow portion 37. Power reception coil 9 is disposed on coil mount 30 at the facing surface 40 side, and filter 11 is disposed in hollow portion 37 at the back surface 41 side. Filter 11 is mounted on an outer peripheral surface of filter core 45. Filter 11 includes filter coil 13 and filter coil 14, which are formed to surround a winding axis O4 extending in downward direction D. Filter coil 13 and filter coil 14 are mounted on filter core 45 so that they are arranged in the vertical direction.

Figure 5:
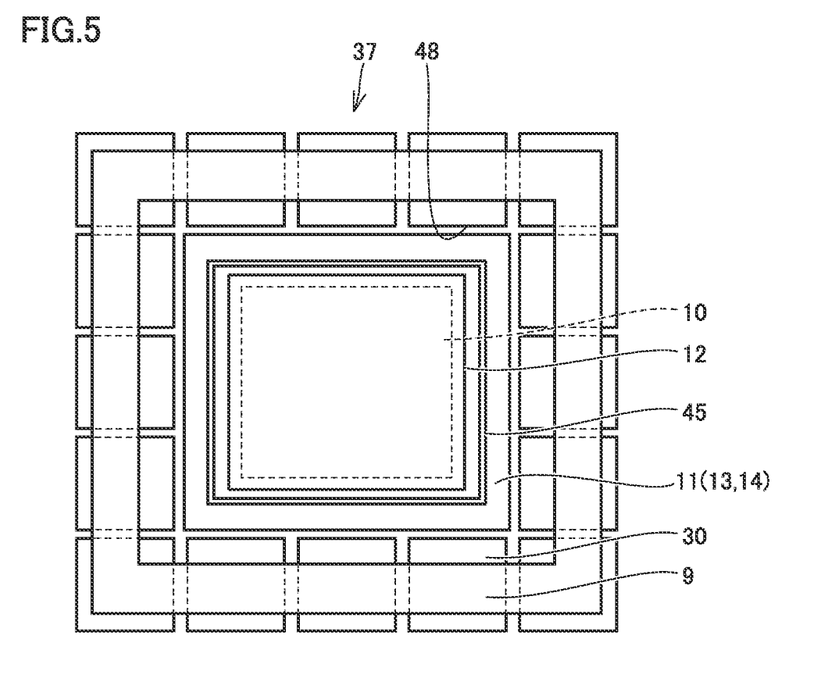
FIG. 5 is a plan view of a coil mount 30, a power reception coil 9, a filter 11 and the like as seen from below power reception device 5.

FIG. 5 is a plan view of coil mount 30, power reception coil 9, filter 11 and the like as seen from below power reception device 5. Central ferrite 31 is omitted in FIG. 5.

As shown in FIG. 5, filter coils 13, 14 and filter core 45 extend along an inner peripheral surface 48 of hollow portion 37, and are formed in an annular shape. As shown in FIG. 4, filter core 45 includes a top plate portion 50 provided on an upper surface of filter 11, and a tube portion 51 extending in downward direction D from an inner edge portion of top plate portion 50. Filter coils 13, 14 are wound around an outer peripheral surface of tube portion 51.

Tube portion 51 is in proximity to central ferrite 31, so that tube portion 51 and central ferrite 31 are magnetically connected to each other. An outer edge portion of top plate portion 50 is also in proximity to the inner peripheral surface of hollow portion 37, so that top plate portion 50 and coil mount 30 are magnetically connected to each other.

When an AC current flows through filter coil 13 and filter coil 14 during power reception, a magnetic flux is formed around filter coil 13 and filter coil 14. This magnetic flux flows through a magnetic circuit CL1 passing through, for example, top plate portion 50, coil mount 30, central ferrite 31 and tube portion 51. With the magnetic flux formed by filter coils 13, 14 flowing well in this manner, a high L value of filter coils 13, 14 can be ensured.

Here, ferrite 15 is a portion through which a magnetic flux from power transmission device 3 flows in and out during power reception. In power reception device 5 according to this embodiment, this ferrite 15 is utilized as a magnetic path for the magnetic flux of filter coils 13, 14. Accordingly, the amount of ferrite required for filter core 45 can be reduced, thereby reducing the size of power reception device 5. During electric power reception, a magnetic flux MF from power transmission device 3 mainly passes at the outer peripheral surface side of central ferrite 31. Thus, the magnetic flux formed by the current flow through filter coils 13, 14 and magnetic flux MF from power transmission device 3 hardly interfere with each other.

While this embodiment has illustrated an example where filter core 45 is provided, filter core 45 is not a necessary requirement.

For example, since inner peripheral surface 48 of hollow portion 37 is elongated in a direction in which coil wires of filter coils 13, 14 extend, a sufficient L value can be ensured by increasing the number of turns of filter coils 13, 14.

Power reception coil 9 is disposed on coil mount 30 at the facing surface 40 side and is provided at the outer peripheral surface side of central ferrite 31, while filter coils 13, 14 are contained in hollow portion 37 at the back surface 41 side of ferrite 15. Thus, magnetic coupling between power reception coil 9 and filter coils 13, 14 is suppressed.

In FIG. 4, a length L1 corresponding to spacing between divided ferrites 36 forming central ferrite 31 is much smaller than a width W1 of each divided ferrite 36. For example, width W1 is set to be 5 to 30 times length L1. In order to suppress the magnetic coupling between filter coils 13, 14 and power reception coil 9, central ferrite 31 and coil mount 30 may be disposed at a distance from each other in the vertical direction, with an annularly extending wall disposed between central ferrite 31 and coil mount 30. The thickness of the annular wall in a horizontal direction is greater than the thickness of coil mount 30 and central ferrite 31 in the vertical direction.

Filter coils 13, 14 and filter core 45 are disposed along inner peripheral surface 48 of hollow portion 37 as described above, filter coil 13, filter coil 14 and filter core 45 are each provided with an opening in its central portion, and filter coil 13, filter coil 14 and filter core 45 have space formed therein where various devices can be contained.

In this example shown in FIG. 4, rectifier 12 and capacitor 10 are disposed in filter core 45.

That is, in power reception device 5 according to this embodiment, filter coils 13, 14 are disposed along divided ferrites 36, thereby ensuring space for containing devices having a low degree of design flexibility with regard to an outer shape of the devices, such as rectifier 12. Accordingly, various devices can be stored in power reception device 5 to save time and effort when mounting power reception device 5 on vehicle 2, while a size increase of power reception device 5 can be suppressed.

Figure 6:
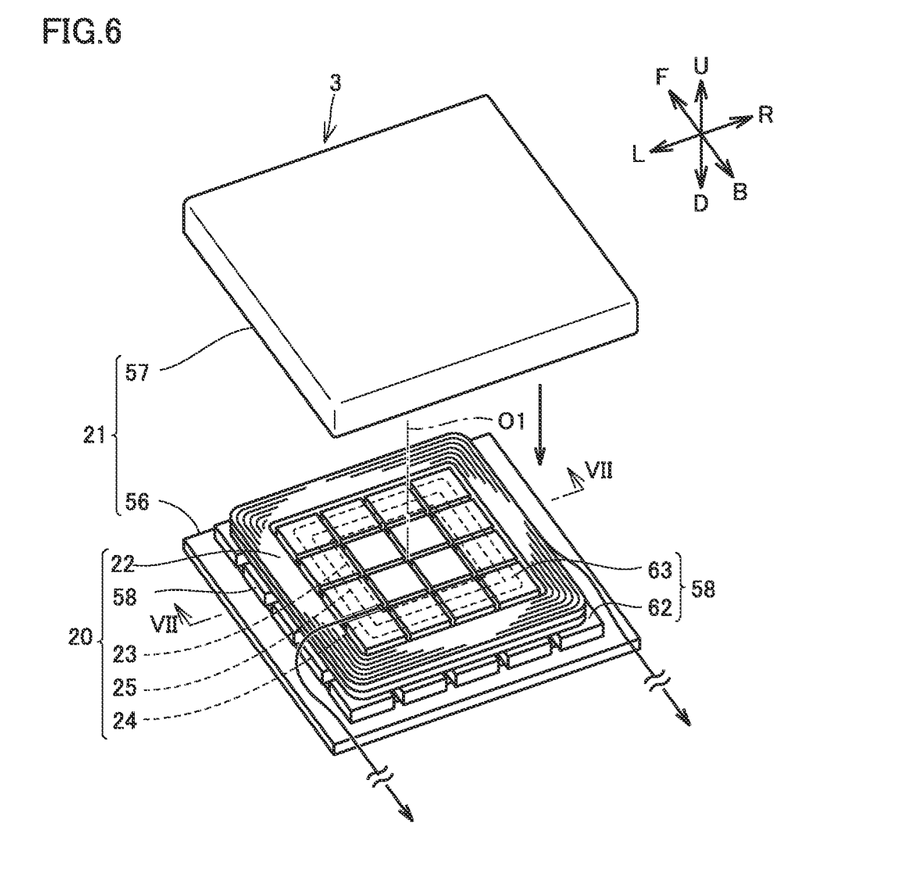
FIG. 6 is an exploded perspective view showing a power transmission device 3.

FIG. 6 is an exploded perspective view showing power transmission device 3. As shown in FIG. 6, power transmission device 3 includes coil unit 20, and housing 21 for containing coil unit 20. Housing 21 includes a base plate 56 made of metal, and a resin cover 57 provided to cover base plate 56.

Coil unit 20 includes a ferrite 58, with power transmission coil 22 disposed on an upper surface of ferrite 58. Power transmission coil 22 is formed to surround a winding axis O1 extending in upward direction U, and is provided with an opening.

Figure 7:
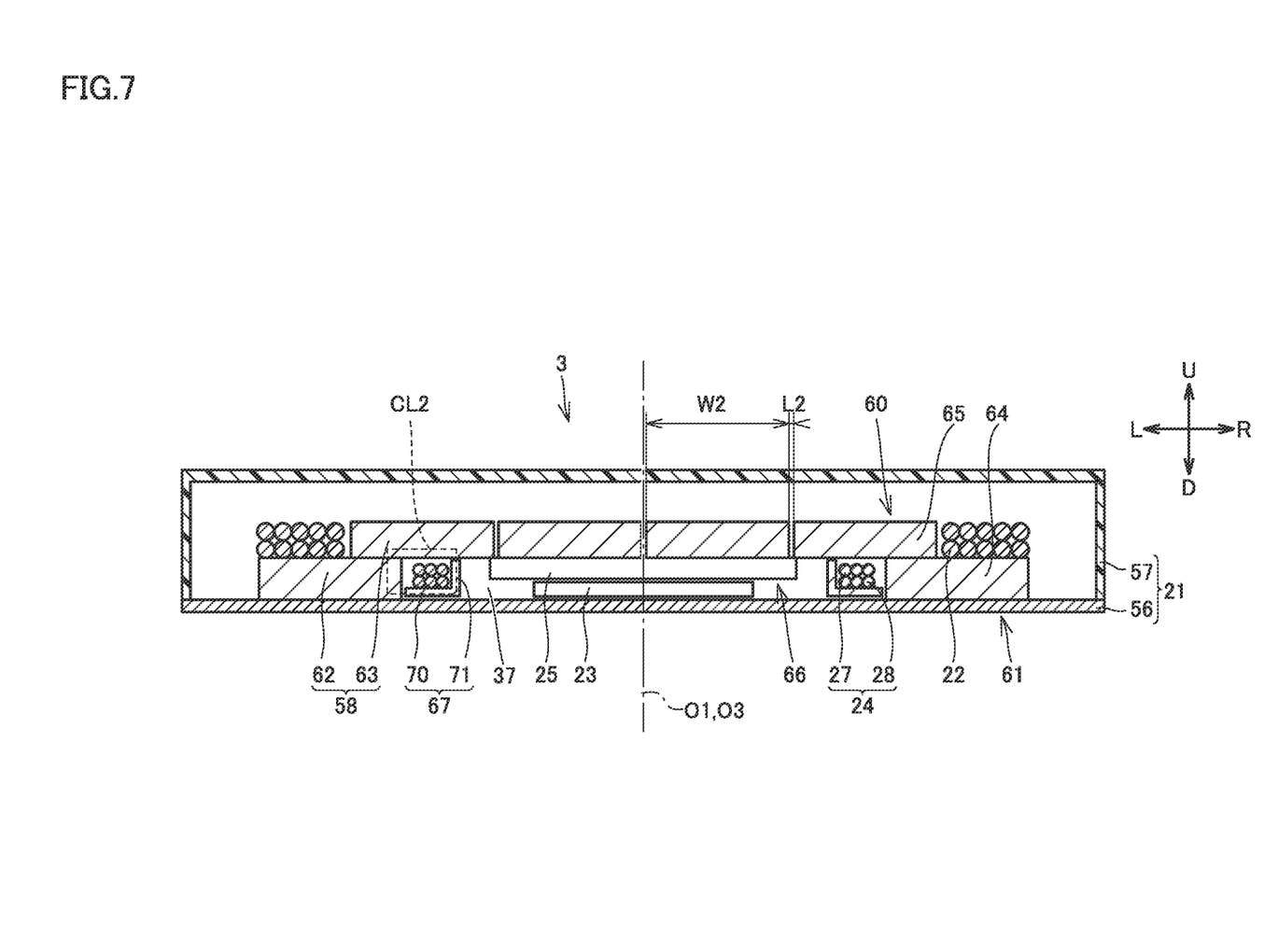
FIG. 7 is a cross-sectional view along line VII-VII in FIG. 6.

FIG. 7 is a cross-sectional view along line VII-VII in FIG. 6. In FIG. 7, when power transmission device 3 transmits electric power to power reception device 5 in a wireless manner, power reception device 5 is disposed in upward direction U relative to power transmission device 3. Accordingly, the upper surface of ferrite 58 serves as a facing surface 60, while a lower surface of ferrite 58 serves as a back surface 61.

Ferrite 58 includes a coil mount 62 on which power transmission coil 22 is disposed at the facing surface 60 side, and a central ferrite 63 provided on a portion of coil mount 62 located on an inner side of power transmission coil 22.

Coil mount 62 includes a plurality of divided ferrites 64, which are disposed at a distance from one another. Central ferrite 63 includes a plurality of divided ferrites 65 disposed in an array. Central ferrite 63 is disposed to close the opening in coil mount 62, and is provided to project in upward direction U from an upper surface of coil mount 62.

Thus, back surface 61 of ferrite 58 is provided with a hollow portion 66 formed of coil mount 62 and central ferrite 63. Power transmission device 3 includes a filter core 67 provided in hollow portion 66.

Filter coil 27 and filter coil 28 are mounted on filter core 67, and are also contained in hollow portion 66.

Filter coils 27, 28 are formed to surround a winding axis O3 extending in upward direction U, and are provided with an opening. Filter coil 27 and filter coil 28 are provided so that they are arranged in the vertical direction.

Figure 8:
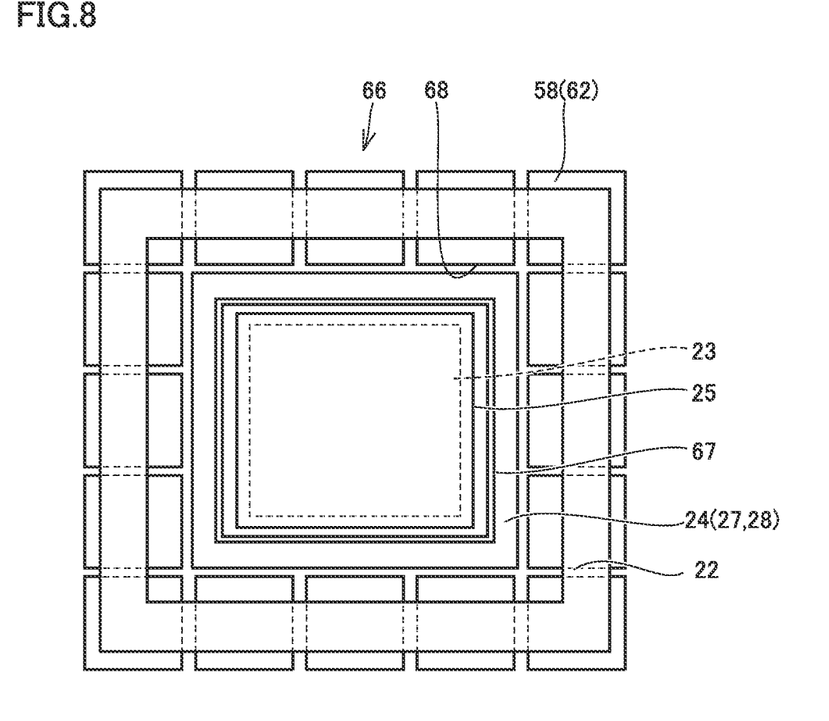
FIG. 8 is a plan view of a ferrite 58, a power transmission coil 22, a filter 24 and the like as seen from above power transmission device 3.

FIG. 8 is a plan view of ferrite 58, power transmission coil 22, filter 24 and the like as seen from above power transmission device 3. Central ferrite 63 is not illustrated in FIG. 8.

As shown in FIG. 8, filter coils 27, 28 and filter core 67 are disposed along an inner peripheral surface 68 of hollow portion 66. As shown in FIG. 7, filter core 67 includes a lower surface portion 70 disposed at the lower surface side of power transmission coil 22, and a tube portion 71 extending in upward direction U from an inner edge portion of lower surface portion 70. Filter coils 27, 28 are wound around an outer peripheral surface of tube portion 71.

Tube portion 71 is provided in proximity to central ferrite 63, so that tube portion 71 and central ferrite 63 are magnetically coupled to each other. Lower surface portion 70 is in proximity to an inner peripheral surface of each divided ferrite 64, so that lower surface portion 70 and divided ferrites 64 are magnetically coupled to each other.

During electric power transmission, an AC current flows through filter coil 27 and filter coil 28, causing a magnetic flux to be formed around each of filter coils 27, 28. This magnetic flux flows through a magnetic circuit CL2 passing through, for example, tube portion 71, central ferrite 63, coil mount 62 and lower surface portion 70.

With the magnetic flux formed by filter 24 flowing well in this manner, a high L value of filter coils 27, 28 can be ensured.

Here, a magnetic flux formed around power transmission coil 22 flows through ferrite 58 during electric power transmission. In this manner, ferrite 58 is a member through which the magnetic flux for transmitting power to power transmission device 3 passes, and this ferrite 58 is utilized as part of the magnetic circuit through which the magnetic flux of filter coils 27, 28 passes.

Thus, the size of the core required to ensure the L value of filter coils 27, 28 can be reduced. Accordingly, the size of filter 11 and the number of components can be reduced, thereby reducing the size of power transmission device 3 and lowering the cost.

While the example shown in FIGS. 7 and the like has illustrated an example where filter core 67 is provided, filter core 67 is not a necessary requirement and can be omitted by increasing the number of turns of filter coils 27, 28.

Power transmission coil 22 is disposed on ferrite 58 at the facing surface 60 side and is provided at the outer peripheral surface side of central ferrite 63. On the other hand, filter coils 27, 28 are contained in hollow portion 66 at the back surface 61 side of ferrite 58. Thus, magnetic coupling between filter coils 27, 28 and power transmission coil 22 is suppressed.

In power transmission device 3, too, a length L2 corresponding to spacing between divided ferrites 65 is much smaller than a width W2 of each divided ferrite 65, so that magnetic coupling between power transmission coil 22 and filter coils 27, 28 is suppressed.

As shown in FIGS. 8 and 7, filter coils 27, 28 and filter core 67 are formed to extend along inner peripheral surface 68, thereby ensuring space for containing various devices in filter core 67 formed as a hollow body.

In this embodiment, capacitor 23 and frequency converter 25 are contained in the aforementioned space. Accordingly, time and effort when installing power transmission device 3 can be reduced, while a size increase of power transmission device 3 can be suppressed.

Although the embodiments the present invention have been described, it should be understood that the embodiments disclosed herein are illustrative and non-restrictive in every respect. The scope of the present invention is defined by the terms of the claims, and is intended to include any modifications within the scope and meaning equivalent to the terms of the claims.

What is claimed is:

1. A power reception device for receiving electric power from an externally provided power transmission device in a wireless manner while being disposed to face the power transmission device, the power reception device comprising:
   a power reception coil formed to surround a first winding axis extending in a power reception direction from the power reception device facing the power transmission device toward the power transmission device, the power reception coil being provided with an opening;
   a filter coil provided on an inner side of the power reception coil and formed to surround a second winding axis extending in the power reception direction; and
   a ferrite on which the power reception coil and the filter coil are disposed,
   the ferrite including a facing surface facing the power transmission device, and a back surface located opposite the facing surface,
   the ferrite including an annular coil mount on which the power reception coil is disposed at the facing surface side, and a projection projecting in the power reception direction from a portion of the coil mount located on an inner side of the power reception coil,
   the back surface of the ferrite being provided with a hollow portion formed of the projection and the coil mount,
   the power reception coil being provided at the outer peripheral surface side of the projection,
   the filter coil being provided along an inner peripheral surface of the hollow portion.

2. The power reception device according to claim 1, further comprising an inductor core provided in the hollow portion and extending along the inner peripheral surface of the hollow portion, wherein
   the inductor core is magnetically connected to the coil mount and the projection, and
   the filter coil is provided on an outer peripheral surface of the inductor core.

3. A power transmission device for transmitting electric power to an externally provided power reception device in a wireless manner while being disposed to face the power reception device, the power transmission device comprising:

a power transmission coil formed to surround a first winding axis extending in a power transmission direction from the power transmission device facing the power reception device toward the power reception device, the power transmission coil being provided with an opening;

a filter coil provided on an inner side of the power transmission coil and formed to surround a second winding axis extending in the power transmission direction; and a ferrite on which the power transmission coil and the filter coil are disposed, the ferrite including a facing surface facing the power reception device, and a back surface located opposite the facing surface, the ferrite including an annular coil mount on which the power transmission coil is disposed at the facing surface side, and a projection projecting in the power transmission direction from a portion of the coil mount located on an inner side of the power transmission coil, the back surface of the ferrite being provided with a hollow portion formed of the projection and the coil mount, the power transmission coil being provided at the outer peripheral surface side of the projection, the filter coil being provided along an inner peripheral surface of the hollow portion.

4. The power transmission device according to claim 3, further comprising an inductor core provided in the hollow portion and extending along the inner peripheral surface of the hollow portion, wherein the inductor core is magnetically connected to the coil mount and the projection, and the filter coil is provided on an outer peripheral surface of the inductor core.

* * * * *